(12) United States Patent
Monro (10) Patent No.: US 7,974,488 B2
(45) Date of Patent: Jul. 5, 2011

(54) MATCHING PURSUITS BASIS SELECTION

(75) Inventor: Donald Martin Monro, Beckington (GB)

(73) Assignee: Intellectual Ventures Holding 35 LLC, Las Vegas, NV (US)

( * ) Notice: Subject to any disclaimer, the term of this patent is extended or adjusted under 35 U.S.C. 154(b) by 1244 days.

(21) Appl. No.: 11/539,164

(22) Filed: Oct. 5, 2006

(65) Prior Publication Data

US 2008/0086519 A1 Apr. 10, 2008

(51) Int. Cl.
*G06K 9/40* (2006.01)

(52) U.S. Cl. ......... 382/260; 382/235; 382/243; 382/275

(58) Field of Classification Search .................. 382/260, 382/274, 275, 235, 243
See application file for complete search history.

(56) References Cited

U.S. PATENT DOCUMENTS

| | | | |
|---|---|---|---|
| 4,168,513 A | 9/1979 | Hains et al. | |
| 4,509,038 A | 4/1985 | Hirano | |
| 4,675,809 A | 6/1987 | Omoda | |
| 4,908,873 A | 3/1990 | Philbert et al. | |
| 5,218,435 A | 6/1993 | Lim et al. | |
| 5,315,670 A | 5/1994 | Shapiro | |
| 5,321,776 A | 6/1994 | Shapiro | |
| 5,412,741 A | 5/1995 | Shapiro | |
| 5,473,384 A * | 12/1995 | Jayant et al. .................. 348/470 |
| 5,559,931 A | 9/1996 | Shindou et al. | |
| 5,699,121 A | 12/1997 | Zakhor et al. | |
| 5,748,786 A | 5/1998 | Zandi et al. | |
| 5,754,704 A | 5/1998 | Barnsley et al. | |
| 5,768,437 A | 6/1998 | Monro et al. | |
| 5,819,017 A | 10/1998 | Akeley et al. | |
| 5,873,076 A | 2/1999 | Barr et al. | |
| 5,923,775 A * | 7/1999 | Snyder et al. .................. 382/172 |
| 5,956,429 A | 9/1999 | Burns | |
| 6,002,794 A * | 12/1999 | Bonneau et al. .............. 382/166 |
| 6,029,167 A | 2/2000 | Evans | |
| 6,052,416 A | 4/2000 | Koga | |
| 6,078,619 A | 6/2000 | Monro et al. | |
| 6,086,706 A | 7/2000 | Brassil et al. | |
| 6,125,348 A | 9/2000 | Levine | |
| 6,144,835 A | 11/2000 | Inoue | |
| 6,208,744 B1 | 3/2001 | Ishige et al. | |
| 6,336,050 B1 | 1/2002 | Amin et al. | |
| 6,434,542 B1 | 8/2002 | Farmen et al. | |
| 6,442,203 B1 * | 8/2002 | Demos ..................... 375/240.16 |
| 6,462,768 B1 * | 10/2002 | Oakley ............................. 348/31 |
| 6,480,547 B1 | 11/2002 | Chen et al. | |
| 6,556,719 B1 | 4/2003 | Monro | |

(Continued)

FOREIGN PATENT DOCUMENTS

EP 0 595 599 A2 5/1994

(Continued)

OTHER PUBLICATIONS

Choog Soo Park et al., "Lost Motion Vector Recovery Algorithm," Circuits and Systems, IEEE International Symposium on London, vol. 3, 1994, pp. 229-232.

(Continued)

*Primary Examiner* — Yosef Kassa
(74) *Attorney, Agent, or Firm* — Sterne, Kessler, Goldstein & Fox PLLC (57) ABSTRACT

Briefly, in accordance with one embodiment, a method of designing a basis selection for matching pursuits is described.

43 Claims, 5 Drawing Sheets

U.S. PATENT DOCUMENTS

| | | | |
|---|---|---|---|
| 6,625,213 | B2 | 9/2003 | Bottreau et al. |
| 6,654,503 | B1 | 11/2003 | Sudharsanan et al. |
| 6,820,079 | B1 | 11/2004 | Evans |
| 6,847,966 | B1 | 1/2005 | Sommer et al. |
| 6,990,145 | B2 | 1/2006 | Monro et al. |
| 7,003,039 | B2 | 2/2006 | Zakhor et al. |
| 7,024,048 | B2 * | 4/2006 | Pazmino et al. .............. 382/253 |
| 7,079,986 | B2 | 7/2006 | Sieracki |
| 7,082,164 | B2 * | 7/2006 | Chaddha ................. 375/240.12 |
| 7,230,551 | B2 | 6/2007 | Moriya et al. |
| 7,248,744 | B2 * | 7/2007 | Cockshott .................... 382/253 |
| 7,292,731 | B2 * | 11/2007 | Sekiguchi et al. ............ 382/238 |
| 7,352,910 | B2 * | 4/2008 | Kanamori et al. ............ 382/254 |
| 2002/0069206 | A1 | 6/2002 | Bergman et al. |
| 2003/0108101 | A1 | 6/2003 | Frossard et al. |
| 2004/0028135 | A1 | 2/2004 | Monro |
| 2004/0126018 | A1 | 7/2004 | Monro |
| 2004/0165737 | A1 | 8/2004 | Monro |
| 2004/0218836 | A1 | 11/2004 | Kanatsu |
| 2005/0149296 | A1 | 7/2005 | Sieracki |
| 2007/0016414 | A1 | 1/2007 | Mehrotra et al. |
| 2007/0030177 | A1 | 2/2007 | Monro |
| 2007/0053434 | A1 | 3/2007 | Monro |
| 2007/0053597 | A1 | 3/2007 | Monro |
| 2007/0053603 | A1 | 3/2007 | Monro |
| 2007/0164882 | A1 | 7/2007 | Monro |
| 2007/0252733 | A1 | 11/2007 | Thebault et al. |
| 2007/0258654 | A1 | 11/2007 | Monro |
| 2007/0282933 | A1 | 12/2007 | Monro |
| 2007/0290898 | A1 | 12/2007 | Monro |
| 2007/0290899 | A1 | 12/2007 | Monro |
| 2008/0005648 | A1 | 1/2008 | Monro |
| 2008/0055120 | A1 | 3/2008 | Monro |
| 2008/0056346 | A1 | 3/2008 | Monro |
| 2008/0084924 | A1 | 4/2008 | Monro |
| 2008/0086519 | A1 | 4/2008 | Monro |

FOREIGN PATENT DOCUMENTS

| | | |
|---|---|---|
| EP | 0 836 325 A1 | 4/1998 |
| EP | 1 545 010 A1 | 6/2005 |
| EP | 1 610 560 A | 12/2005 |
| GB | 2 293 733 A | 4/1996 |
| GB | 2 409 943 A | 7/2005 |
| WO | WO97/16029 | 5/1997 |
| WO | WO98/11730 | 3/1998 |
| WO | WO99/08449 | 2/1999 |
| WO | WO01/15456 | 3/2001 |
| WO | WO01/63935 | 8/2001 |
| WO | WO02/13538 | 2/2002 |
| WO | WO2004/051863 | 6/2004 |
| WO | WO2005/027049 | 3/2005 |
| WO | WO 2005/064799 | 7/2005 |
| WO | WO 2005/067661 | 7/2005 |
| WO | WO2005/119581 | 12/2005 |
| WO | WO2007/030702 | 3/2007 |
| WO | WO2007/030784 | 3/2007 |
| WO | WO2007/030785 | 3/2007 |
| WO | WO2007/030788 | 3/2007 |
| WO | WO 2007/084336 | 7/2007 |
| WO | WO 2007/118220 | 10/2007 |
| WO | WO 2007/145875 | 12/2007 |
| WO | WO 2007/149358 | 12/2007 |
| WO | WO 2007/149383 | 12/2007 |
| WO | WO 2007/149384 | 12/2007 |
| WO | WO 2008/027450 | 3/2008 |
| WO | WO 2008/030426 | 3/2008 |
| WO | WO/2008/045280 | 4/2008 |
| WO | WO/2008/045281 | 4/2008 |

OTHER PUBLICATIONS

Final Office Action for U.S. Appl. No. 11/332,777, mailed Aug. 13, 2008, 5 pgs.

Final Office Action for U.S. Appl. No. 11/255,090, mailed Sep. 3, 2008, 11 pgs.

Non-Final Office Action for U.S. Appl. No. 11/425,142, mailed Sep. 16, 2008, 12 pgs.

International Search Report for Appln. No. PCT/US2008/002179, issued Aug. 20, 2008, 12 pgs.

Non-Final Office Action for U.S. Appl. No. 11/255,090, dated Dec. 15, 2008, 11 pgs.

International Search Report and Written Opinion for Appln. No. PCT/US2008/002101, dated Dec. 12, 2008, 13 pgs.

Cotter et al., "Application of Tree-Based Searches to Matching Pursuit," 2001 IEEE International Conference on Acoustics, Speech and Signal Processing, New York, NY, vol. 6, 7, May 2001, pp. 3933-3936.

Shoa et al., "Tree Structure Search for Matching Pursuit," Image Processing, 2005, vol. 3, 11, pp. 908-911.

Qiangsheng Liu et al., "A low-cost video encoder with matching pursuit," Intelligent Multimedia, Video and Speech Processing, May 2, 2001, pp. 502-505.

Yuan Yuan et al., "Improved Matching Pursuits Image Coding," Acoustics, Speech, and Signal Processing, 2005, vol. 2, 18, pp. 201-204.

International Search Report and Written Opinion for Appln. No. PCT/US2008/002100, dated Dec. 12, 2008, 14 pgs.

International Search Report for Appln. No. PCT/US2007/021302, dated Dec. 10, 2008, 5 pgs.

Haoxing Zhang et al., "A Hybrid Video Coder Based on H.264 with Matching Pursuits," Acoustics, Speech and Signal Processing, 2006, p. 889.

Yuan et al., "3D Wavelet Video Coding with Replicated Matching Pursuits," Sep. 11, 2005, Image Processing, pp. 69-72.

Monro et al., "Subband Adaptive Dictionaries for Wavelet/Matching Pursuits Image Coding," Oct. 8, 2006, Image Processing, p. 2136.

Chien-Kai et al., "Matching Pursuits Low Bit Rate Video Codign with Codebooks Adaptation," Jun. 5, 2000, Acoustics, Speech, and Signal Processing, pp. 408-411.

International Search Reportfor Appln. No. PCT/US2007/021303, dated Dec. 12, 2008, 5 pgs.

Rabiee et al., "Scalable Subband Image Coding with Segmented Orthogonal Matching Pursuit," Oct. 4, 1998, Image Processing, pp. 774-777.

Rabiee et al., "Low-bit-rate Subband Image Coding with Matching Pursuits," Visual Communications and Image Processing, vol. 3309, 1998, pp. 875-880.

Schmid-Saugeon et al., "Dictionary Design for Matching Pursuit and Application to Motion-Compensated Video Coding," 2004, IEEE Transactions on Circuits and Systems for Video Technology, pp. 880-886.

International Search Report for Appln. No. PCT/US2007/019297, dated Dec. 12, 2008, 5 pgs.

Non-Final Office Action for U.S. Appl. No. 11/422,316, mailed Dec. 4, 2008, 13 pgs.

Non-Final Office Action for U.S. Appl. No. 11/255,090, mailed Dec. 15, 2008, 15 pgs.

Non-Final Office Action for U.S. Appl. No. 11/332,777, mailed Feb. 25, 2009, 6 pgs.

Final Office Action for U.S. Appl. No. 11/425,142, mailed Mar. 2, 2009, 18 pgs.

International Search Report for Appln. No. PCT/US2007/014181 issued Jan. 23, 2008, 1 pg.

David Salomon, "Data Compression: The Complete Reference," 1998, Springer, XP002464409, pp. 32-33.

Non-Final Office Action for U.S. Appl. No. 11/677,511, mailed Feb. 20, 2009, 23 pgs.

Non-Final Office Action for U.S. Appl. No. 11/677,515, mailed Feb. 25, 2009, 21 pgs.

Brin et al., Copy detection mechanisms for digital documents, Proceedings of the 1995 ACM SIGMOD international conference on Management of data SIGMOD '95, vol. 24 ACM Press, May 1995, pp. 398-409.

Cancedda et al., Word Sequence Kernels, Mar. 2003, MIT Press, Journal of Machine Learning Research, vol. 3 Special Edition, pp. 1059-1082.

Cover et al. "Elements of Information Theory" Copyright Jon Wiley & Sons, Inc., p. 96, 1991.

De Natale, et al., "A Mesh-Interpolation Scheme for Very-Low Bitrate Coding of Video Sequences" European Transactions on Telecommunications, vol. 9, No. 1, pp. 47-55, 1998.
De Vleeschouwer et al., "Subband dictionaries for low-cost matching pursuits of video residues," IEEE Transactions on Circuits and Systems for Video Technology, vol. 9, Issue 7, pp. 984-993, Oct. 1999.
Gamito et al. "Lossles Coding of Floating Point Data with JPEG 2000 Part 10" Proceedings of the SPIE, SPIE, Bellingham, VA, US. vol. 5558, Aug. 2, 2004. pp. 276-287.
Golomb, S.W., "Run-length encodings" IEEE Trans Info Theory, Jul. 1966, 12(3):399-401.
Horst et al. "Mupcos: A multi-purpose coding scheme" Signal Processing: Image Communication 5, pp. 75-89, 1993.
Hosang, M., "A Character Elimination Algorithm for Lossless Data Compression" Data Compression Conference, Proceedings. DCC, IEEE Computer Society Press, Los Alamitos, CA, US, Apr. 2, 2002, pp. 1-10.
Huffman, David A., "A Method for the Construction of Minimum-Redundancy Codes," Pro. Inst. Radio Eng., 1952, 9 (40), pp. 1098-1101.
Hull, Jonathan J., "Document Image Matching and Retrieval with Multiple Distortion-Invariant Descriptors", International Association for Pattern Recognition Workshop on Document Analysis Systems, Series in Machine Perception and Artificial Intelligence, vol. 14, published by World Scientific Publishing Co. Pte. Ltd. 1995, pp. 379-396.
Jun-peng Bao et al., "A new text feature extraction model and its application in document copy detection" Machine Learning and Cybernetics, 2003, International Conference on Nov. 2-5, 2003 Piscataway, NJ, USA, IEEE, vol. 1, Nov. 2, 2003, pp. 82-87.
Larsson, N.J., "The Context Trees of Block Sorting Compression" In Proceedings of the IEEE Data Compression Conference, Snowbird, Utah, Mar. 30-Apr. 1, pp. 189-198. IEEE Computer Society Press, 1998.
Said et al., "A New, Fast, and Efficient Image Codec Based on Set Partitioning in Heirarchical Trees" IEEE Transactions on Circuits and Systems for Video Technology, vol. 6, No. 3, pp. 243-250, Jun. 1996.
Sayood, Khalid, "Introduction to Data Compression" Morgan Kaufmann Publishers Inc., San Francisco, CA, USA 1996, pp. 27-32.
Sayood, Khalid, "Introduction to Data Compression" Morgan Kaufmann Publishers Inc., San Francisco, CA, USA 1991, pp. 98-99.
Salomon, "Data Compression: the complete reference", Springer, pp. 32-33, 1998.
Schleimer et al., Data security protection: Winnowing: local algorithms for document fingerprinting, 2003 ACM SIGMOD international conference on Management of data (SIGMOD '03), ACM Press, Jun. 2003, pp. 76-85.
Teuhola, J. "A Compression Method for Clustered Bit-Vectors" Information Processing Letters, Amsterdam, NL, vol. 7, No. 6, pp. 308-311, Oct. 1978.
Tian et al., "Image Data Processing in the Compressed Wavelet Domain" Proceedings of ICSP'96, pp. 978-981, 1996.
Trott et al. "Wavelets Applied to Lossless Compression and Progressive Transmission of Floating Point Data in 3-D Curvilinear Grids" IEEE Proceedings of the Visualization Conference, Oct. 27, 1996, pp. 385-388.
Donald Monro, U.S. Appl. No. 11/677,515, filed Feb. 21, 2007, entitled "Hierarchical Update Scheme for Extremum Location with Indirect Addressing".
Donald Monro, U.S. Appl. No. 11/678,004, filed Feb. 22, 2007, entitled, "Video Coding With Motion Vectors Determined by Decoder".
Donald Monro, U.S. Appl. No. 11/678,479, filed Feb. 23, 2007, entitled, "Video Coding With Embedded Motion".
Donald Monro, U.S. Appl. No. 11/777,256, filed Jul. 11, 2007.
Donald Monro, U.S. Appl. No. 11/677,511, filed Feb. 21, 2007, entitled "Hierarchical Update Scheme for Extremum Location".
Donald Monro, U.S. Appl. No. 11/777,239, filed Jul. 12, 2007.
Donald Monro, U.S. Appl. No. 11/777,230, filed Jul. 12, 2007.
Donald Monro, U.S. Appl. No. 11/777,130, filed Jul. 12, 2007.
Donald Monro, U.S. Appl. No. 11/777,144, filed Jul. 12, 2007.
Donald Monro, U.S. Appl. No. 11/777,122, filed Jul. 12, 2007.
Donald Monro, U.S. Appl. No. 11/777,100, filed Jul. 12, 2007.
Donald Monro, U.S. Appl. No. 11/777,081, filed Jul. 12, 2007.
Donald Monro, U.S. Appl. No. 11/777,022, filed Jul. 12, 2007.
Donald Monro, U.S. Appl. No. 11/776,786, filed Jul. 12, 2007.
Donald Monro, PCT Serial No. PCT/US2007/008861, filed Apr. 9, 2007, entitled "Motion Assisted Data Enhancement".
Donald Monro, PCT Serial No. PCT/US2008/002100, filed Feb. 19, 2008, entitled "Hierarchical Update Scheme for Extremum Location".
Donald Monro, PCT Serial No. PCT/US2008/002101, filed Feb. 19, 2008, entitled "Hierarchical Update Scheme for Extremum Location with Indirect Addressing".
International Search Report for Appln. No. PCT/US2007/013100 issued Jan. 14, 2008, 4pgs.
International Search Report for Appln. No. PCT/US2007/000759 issued Feb. 14, 2008, 7pgs.
International Search Report for Appln. No. PCT/US2007/014138 issued Oct. 29, 2007, 2 pgs.
International Search Report for Appln. No. PCT/US2007/014182 issued Jan. 18, 2008, 1 pg.
International Search Report for Appln. No. PCT/US2007/014181 issued Jan. 14, 2008.
Non-Final Office Action for U.S. Appl. No. 11/255,090, completed Feb. 2, 2008, mailed Feb. 6, 2008, 14pgs.
Non-Final Office Action for U.S. Appl. No. 11/332,777, completed Dec. 12, 2007, mailed Dec. 21, 2007, 4pgs.
Final Office Action for U.S. Appl. No. 11/425,142, completed Sep. 10, 2007, mailed Sep. 18, 2007, 9 pgs.
Non-Final Office Action for U.S. Appl. No. 11/425,142, completed Mar. 7, 2007, mailed Mar. 20, 2007, 8 pgs.
Written Opinion for U.S. Appl. No. 11/470,611, completed Aug. 29, 2007, mailed Sep. 5, 2007, 6 pgs.
Written Opinion for Appln. No. PCT/US2007/000759 completed Feb. 14, 2007, mailed Feb. 25, 2008, 11pgs.
International Search Report for Patent Cooperation Treaty Appln. No. PCT/US2007/019034 issued Apr. 8, 2008, 2 pgs.
Written Opinion for Patent Cooperation Treaty Appln. No. PCT/US2007/019034 completed Mar. 31, 2008, mailed Apr. 8, 2008, 7 pgs.
Non-Final Rejection for U.S. Appl. No. 11/470,611, mailed on Jun. 30, 2008, 5 pgs.
Non-Final Rejection for U.S. Appl. No. 11/422,316, mailed on Jul. 3, 2008, 7 pgs.
U.S. Appl. No. 11/255,090, filed Oct. 19, 2005, Monro.
Monro et al., "Bases for Low Complexity Matching Pursuits Image Coding" www.http://dmsun4.bath.ac.uk, May 2005.
Yuan et al., "Improved Matching Pursuits Image Coding" IEEE International Conference on Acoustics, Speech and Signal Processing ICASSP 2005, pp. II-201-II-204, Mar. 2005.
Monro, "Basis Picking for Matching Pursuits Image Coding" IEEE International Conference on Image Processing, pp. 2495-2498, Sep. 2004.
Yuan et al., "Low Complexity Separable Matching Pursuits" IEEE Int. Conference Acoustics Speech Signal Process, pp. 111-725-728, May 2004.
Figueras et al., "Color Image Scalable Coding with Matching Pursuit" IEEE Int. Conference Acoustics Speech Signal Process, pp. III-53-56, May 2004.
Monro et al., "Improved Coding of Atoms in Matching Pursuits" IEEE Int. Conf. Image Process, vol. 2, Sep. 2003.
Frossard et al., "High Flexibility Scalable Image Coding" Proceedings of VCIP 2003, Jul. 2003.
Poh et al., "Comparison of Residual Compression Methods in Motion Compensated Video" IEEE Int. Workshop on Multimedia Signal Processing, pp. 109-112, Dec. 2002.
Moschetti et al., "New Dictionary and Fast Atom Searching Method for Matching Pursuit Representation of Displaced Frame Difference" IEEE International Conference on Image Processing, pp. III-685-688, Sep. 2002.
Neff et al., "Matching Pursuit Video Coding—Part I: Dictionary Approximation" IEEE Trans. Circuits System Video Technology, vol. 12, No. 1, pp. 13-26, Jan. 2002.

Tredwell et al., "A Sequential Vector Selection Algorithm for Controllable Bandwidth Motion Description Encoding" IEEE Sympos. Intell. Multimedia. Video & Speech Process, May 2001.

Czerepinski et al., "Matching Pursuits Video Coding: Dictionaries and Fast Implementation" IEEE Trans Circuit Systems Video Technology, vol. 10, No. 7, pp. 1103-1115, Oct. 2000.

Monro et al., "Visual Embedding of Wavelet Transform Coefficients" IEEE International Conference Image Process, pp. 186-189, Sep. 2000.

Neff et al., "Very Low Bit-Rate Video Coding Based on Matching Pursuits" IEEE Trans. Circuits and Systems for Video Tech., vol. 7, No. 1, pp. 158-171, Feb. 1997.

Mallat et al., "Matching Pursuits with Time-Frequency Dictionaries" IEEE Trans. Signal Processing, vol. 41, No. 12, pp. 3397-3415, Dec. 1993.

Steffen et al., "Theory of Regular $M$-band Wavelet Bases" IEEE Transactions on Signal Processing, vol. 41, No. 12, pp. 3497-3511, Dec. 1993.

Shapiro, "Embedded Image Coding Using Zerotrees of Wavelet Coefficients" IEEE Transactions on Signal Processing, vol. 41, No. 12, pp. 3445-3462, Dec. 1993.

Ramchandran et al., "Best Wavelet Packet Bases in a Rate-Distortion Sense" IEEE Transactions on Signal Processing, vol. 2, No. 2, pp. 160-175, Apr. 1993.

Mallat, "A Theory for Multiresolution Signal Decomposition: The Wavelet Representation" IEEE Trans. Pattern Anal. Mach. Intel., vol. 11, No. 7, Jul. 1989.

Daubechies, "Orthonormal Bases of Compactly Supported Wavelets" Comm. Pure Appl. Math., vol. 41, pp. 909-996, 1988.

International Preliminary Report on Patentability and Written Opinion for Appln. No. PCT/US2007/021302 completed Apr. 7, 2009, mailed Apr. 16, 2009, 9 pgs.

International Preliminary Report on Patentability and Written Opinion for Appln. No. PCT/US2007/021303 completed Apr. 7, 2009, mailed Apr. 16, 2009, 9 pgs.

\* cited by examiner

FIG. 1

PSNR as successive bases are selected in a 14x14 separable codebook at a fixed rate of 0.4 bpp

FIG. 2

| Picked No $k$ | Width $d$ $2w_k + 1$ | Frequency $d$ $f_k$ | Phase (*π/4) | Attenuation $\sigma_k$ |
|---|---|---|---|---|
| 1 | 1 | 0 | 0 | 1 |
| 2 | 5 | 0 | 0 | 8 |
| 3 | 9 | 3 | 1.5 | 2 |
| 4 | 9 | 0 | 0 | 24 |
| 5 | 9 | 1 | 1 | 2 |
| 6 | 3 | 1 | 0 | 2 |
| 7 | 5 | 1 | 2 | 1 |
| 8 | 3 | 0 | 0 | 12 |
| 9 | 7 | 2 | 1.5 | 12 |
| 10 | 7 | 1 | 1.5 | 4 |
| 11 | 7 | 0 | 0 | 12 |
| 12 | 5 | 2 | 0 | 12 |
| 13 | 9 | 1 | 2 | 8 |
| 14 | 5 | 1 | 1 | 24 |

FIG. 3

| Picked No k | LL Basis | HL Basis | LH Basis | HH Basis |
|---|---|---|---|---|
| 1 | 1,1 | 1,1 | 1,1 | 1,1 |
| 2 | 4,11 | 1,11 | 2,1 | 4,2 |
| 3 | 1,7 | 1,8 | 5,6 | 11,4 |
| 4 | 3,1 | 6,3 | 7,1 | 1,5 |
| 5 | 8,1 | 1,6 | 6,1 | 3,1 |
| 6 | 9,2 | 5,14 | 10,5 | 1,3 |
| 7 | 3,3 | 6,1 | 7,6 | 6,3 |
| 8 | 9,3 | 1,13 | 2,7 | 8,3 |
| 9 | 2,2 | 14,6 | 8,7 | 3,6 |
| 10 | 6,9 | 1,4 | 7,8 | 3,8 |
| 11 | 10,5 | 3,8 | 4,1 | 12,1 |
| 12 | 1,8 | 6,14 | 6,6 | 14,6 |
| 13 | 5,5 | 6,11 | 9,1 | 1,14 |
| 14 | 9,11 | 8,3 | 10,9 | 5,6 |
| 15 | 1,6 | 6,6 | 1,5 | 9,1 |
| 16 | 14,10 | 1,10 | 6,3 | 13,12 |
| 17 | 4,1 | 1,5 | 7,13 | 10,1 |
| 18 | 6,2 | 1,9 | 13,6 | 11,9 |
| 19 | 6,7 | 6,5 | 1,8 | 9,6 |
| 20 | 14,6 | 14,7 | 1,8 | 5,8 |
| 21 | 10,7 | 8,8 | 9,14 | 12,11 |
| 22 | 3,7 | 12,7 | 6,12 | 7,5 |
| 23 | 6,14 | 6,4 | 6,7 | 7,12 |
| 24 | 12,5 | 12,6 | 4,6 | 10,6 |
| 25 | 13,1 | 1,12 | 7,3 | 10,14 |
| 26 | 14,12 | 6,9 | 8,14 | 6,1 |
| 27 | 4,3 | 6,10 | 3,13 | 1,7 |
| 28 | 12,7 | 1,14 | 3,1 | 6,12 |
| 29 | 7,7 | 14,14 | 6,2 | 4,6 |
| 30 | 1,4 | 10,1 | 10,2 | 1,2 |
| 31 | 13,2 | 2,13 | 13,7 | 5,9 |
| 32 | 12,4 | 7,14 | 3,12 | 2,11 |
| 33 | 6,3 | 13,14 | 11,13 | 9,3 |
| 34 | 12,3 | 4,14 | 2,12 | 6,7 |
| 35 | 11,6 | 11,14 | 5,11 | 13,1 |
| 36 | 12,6 | 6,7 | 8,1 | 5,2 |
| 37 | 4,6 | 2,9 | 9,5 | 11,1 |
| 38 | 12,1 | 7,10 | 13,1 | 4,4 |
| 39 | 11,1 | 11,3 | 5,2 | 6,9 |
| 40 | 10,9 | 10,14 | 5,1 | 12,8 |
| 41 | 5,14 | 6,12 | 5,3 | 5,14 |
| 42 | 11,3 | 7,11 | 7,2 | 13,13 |
| 43 | – | 14,5 | 10,4 | 8,7 |
| 44 | – | 9,7 | – | – |
| 45 | – | 3,7 | – | – |
| 46 | – | 11,5 | – | – |

MATCHING PURSUITS BASIS SELECTION

FIELD

This application pertains to the field of coding data, and more particularly, to the field of selection of bases for coding data using transforms and/or matching pursuits.

BACKGROUND

Digital data for various forms of content, such as, without limitation, digital images, digital video, and/or audio information, is delivered today via wireless transmission networks, digital satellite services, streaming video and/or audio over the Internet and more. For example, again, without limitation, delivering video and/or audio content in a digital dataform to personal digital assistants, cellular phones and/or other devices is continuing to increase in popularity. Therefore, a need continues for data compression and decompression techniques to allow efficient transmission and storage of digital data, regardless of the content the data represents.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

Matching pursuits processes may be used to compress one dimensional or multi-dimensional data, including but not limited to: still images, audio, video, and/or digital images. A matching pursuits process may include finding a full inner product between a signal to be coded and members of a dictionary of basis functions. At a position of an inner product, a dictionary entry giving an inner product may describe the signal locally. This may be the maximum inner product over all or part of the signal. This may be referred to as an "Atom." Amplitude may be quantized, and position, quantized amplitude, sign, and dictionary number may be combined to form a code describing a particular Atom, for example. For one embodiment, quantization may be performed using a precision limited quantization method. Other embodiments may use other quantization techniques. Claimed subject matter is not limited in scope to any particular quantization method or technique. All potential quantization methods now known or to be developed are intended to be included.

In one particular embodiment, an Atom is subtracted from a signal giving a residual. The signal may be completely and/or partially described by the Atom plus the residual. The process may be repeated with new Atoms successively found and subtracted from the residual. At any stage, the signal may be completely described by the codes of the Atoms found and the remaining residual.

Matching pursuits (MP), therefore, may decompose any signal f into a linear expansion of waveforms that may belong to a redundant dictionary $D=\phi\{y\}$ of basis functions, such that $$f = \sum_{n=0}^{m-1} \alpha_n \varphi_{\gamma_n} + R^m f$$

where $R^m f$ is the $m^{th}$ order residual vector after approximating f by m 'Atoms' and $$\alpha_n = \langle \varphi_{\gamma_{n'}} R^n f \rangle$$

is an inner product at stage n of a dictionary with an $n^{th}$ order residual, for this particular embodiment.

For some embodiments, a dictionary of basis functions may comprise two-dimensional bases. Other embodiments may use dictionaries comprising one-dimensional bases which may be applied separably to form two-dimensional bases. To do this, a selected basis function may be applied to a set of data in one of its dimensions and another basis function may subsequently be applied in another dimension, the remaining dimension if there are two dimensions. A dictionary of b basis functions in one dimension may provide $b^2$ combinations which form a dictionary of $b^2$ basis functions in two dimensions, for example. This may likewise be extended to any number of dimensions. Therefore, in this context, the term "separably" includes applying different basis functions to data separately.

As described in more detail hereinafter, a method is described which may reduce complexity of a codebook to be applied to coding of multi-dimensional data. Likewise, improved representation of the data may also at times occur. In this particular embodiment, a dictionary of n dimensional bases may be formed separably, as described above, for example, from a set of previously determined 1D bases, although, of course, claimed subject matter is not limited in scope in this respect. A subset of a full n dimensional dictionary may be selected for coding data. In one particular embodiment, although claimed subject matter is not limited in scope in this respect, this may be implemented using a mask to select a subset of a full dictionary. For images, as one example, for a range of numbers of selected bases for a bit rate, a PSNR may, at times, provide improved results in comparison with a full 2D codebook. As described in more detail hereinafter, results with sparse dictionaries, therefore, may have lower computational cost while maintaining data integrity to a high degree.

As is known, a dictionary may play a role in terms of speed for a particular method or process of compression. See, for example, Monro, D. M., "Basis Picking for Matching Pursuits Image Coding", IEEE International Conference on Image Processing (ICIP 2004), Singapore, September 2004; Yuan Yuan and Monro., D. M., "Improved Matching Pursuits Image Coding", IEEE International Conference on Acoustics, Speech and Signal Processing ICASSP 2005, Philadelphia, March 2005. However, a dictionary may also play a role in complexity and accuracy, as explained in more detail hereinafter.

For example, if the number of 1D bases is b and the basis width or 'footprint' is $d=(2wk+1)$, then in 2D there are $b^2$ bases. One aspect of a MP process includes repairing or updating inner products in a region of an Atom that has been removed from the data. This may involve calculation of inner products in a $d \times d = d^2$ region of the image. Even if done separably, one may compute inner products in a first dimension with bases in a 1D region of extent $2d-1$ for b bases of width d, at a computational cost of order $bd2$ followed by inner products in a second dimension in a 2D region of extent $2d-1$ by $2d-1$ for b results of the first stage, using b bases of width d, at a computational cost of order $b^2d^3$. In this example, therefore, the second stage is more complex. In higher dimensions, the gain has the potential to be greater since complexity in n dimensions may be proportional to $b^N d^{N+1}$.

In general, a large codebook may give a greater accuracy for a particular number of Atoms selected; however, it may also employ more bits to code an Atom from a larger codebook. Therefore, at a selected bit rate, for example, it may not give the greatest accuracy. As is well-known, reducing the codebook size by half may reduce the bit cost of coding an Atom by 1 bit in the case where all bases are equally likely. More particularly, the cost of coding any of N equally probable symbols is well-known to be $\log_2 N$. Although typically probabilities of occurrence of the bases will, in general, not be equal, a similar effect may occur if the probabilities do not vary widely. Thus, a reduction in the cost of coding may occur as dictionary size is reduced. By trimming an n dimensional codebook, one may accomplish a beneficial rate/distortion trade-off, e.g., a lower distortion at a given rate or a lower bit rate for a given distortion.

In one particular embodiment, a reduced dictionary may be implemented as a mask applied to a full n dimensional dictionary by indicating which bases are to be applied. By referring to this mask, bases from a separable codebook may be selected to perform inner product calculations in a Matching Pursuits (MP) process, or applied to the data in other coding applications. For such an embodiment, while all bases may in some embodiments be considered in a first stage operation of separable computation, not all combinations are used in the second dimension, and fewer still are used in higher dimensions, potentially reducing the number of calculations. This complexity reduction has the potential to make computations feasible, especially for higher dimensional coding tasks that previously may not have been feasible. Likewise, in other embodiments, less than all bases may be considered as well in a first operation, for example. These embodiments are merely intended as illustrative examples; however, many other embodiments are intended and contemplated to be including within the scope of claimed subject matter.

A resulting dictionary may be used on a signal, or data that has been transformed, such as by a wavelet transform. Furthermore, a resulting dictionary may be utilized to code data with an MP process. This process may also be used with other data, including audio, visual, video, multi-dimensional, and/or non-transformed data. Furthermore, a resulting dictionary may be used to code many different types of transformed and/or non-transformed data. Yet further, an embodiment of a method and/or system, for example, within the scope of claimed subject matter, may be utilized to determine resulting dictionaries and/or codebooks for many different types of data coding.

For compression, for example, an MP process may be terminated at some stage and codes for a number of Atoms may stored and/or transmitted by a further coding process. For one embodiment, the further coding process may be a lossless coding process, although claimed subject matter is not limited in scope in this respect. Other embodiments may use other coding techniques, including non-lossless coding techniques, for example.

For example, in one embodiment, an image may be represented as a two-dimensional array of coefficients. A coefficient may represent an intensity levels at a point in such an embodiment, for example. Many images have smooth intensity variations, with the fine details being represented as sharp edges in between the smooth variations. The smooth variations in intensity may be interpreted, therefore, as low frequency components and the sharp variations as high frequency components. Low frequency components (e.g., smooth variations) may comprise gross information for an image, and high frequency components may include information to add detail to the gross information.

One technique for separating low frequency components from high frequency components may include a Discrete Wavelet Transform (DWT) applied to an image, although this is merely provided as one example and claimed subject matter is not limited in scope to this particular embodiment. Many forms of images might be used, including, for example, still images, whether monochrome or color, which may be called intra frames in video, or the residual frames, whether monochrome or color, after motion prediction in a motion compensated video compression system, which may be called displaced frame difference images. Again, these are merely examples and claimed subject matter is not limited in scope to these examples. Nonetheless, continuing this discussion, wavelet decomposition may include the application of Finite Impulse Response (FIR) filters to separate image data into sub-sampled frequency bands. The application of the FIR filters may occur in an iterative fashion, for example, as described below in connection with FIG. 1. However, again, this is merely an example embodiment and many other approaches are possible and are intended to be included within the scope of claimed subject matter.

An additional aspect of this particular embodiment, although claimed subject matter is not limited in scope in this respect, is that many methods of coding data involve performing a frequency separating or other transform prior to coding. Transform coding may at times be desirable to apply since after transformation desired information in the data may become concentrated into coefficients that are produced or a subset of those coefficients. One example, again, without limited the scope of claimed subject matter includes the Wavelet Transform, in which an image transformation takes place that reorganizes data into frequency bands, whereby the information in the data becomes concentrated into regions of the transform coefficients according to particular characteristics of the data being transformed. Other transforms may, again, be used. This is merely one convenient example. For example, for Fourier transforms or a Discrete Cosine Transform, often applied to blocks of an image, a coefficient may be associated with a particular range of frequencies. We note that these transforms are themselves associated with specific basis dictionaries. For example, basis dictionaries of a Fourier Transform comprise full-period sine and cosine waveforms and basis dictionaries of a Discrete Cosine Transform comprise full and half period cosines waveforms.

Therefore, continuing with this particular embodiment, regardless of the transform used, once collected into blocks or bands having similar frequency characteristics, it may readily be seen that particular types of information collect into particular regions. One aspect of this particular embodiment, as described in more detail below, performance or results may be improved by employing different codebooks for different regions, such as of a transformed image, for example.

Taking the wavelet transform as an example for this discussion, bands designated HH and LL have no particular orientation of data, and so their most effective types of basis functions may be expected not to have a bias towards horizontal or vertical orientation. This is borne out in practice. However, the LL band is the result of repeated low pass filtering and so is expected to be relatively smooth. A dictionary of low frequency (smooth) bases is therefore also expected to be useful in the LL band. By contrast, the HH band has been high pass filtered in both directions. For this band, of course, information is expected to be localised and spiky, e.g., high frequency. We would, thus, expect HH bands to be represented by relatively high frequency information.

Figure 1:
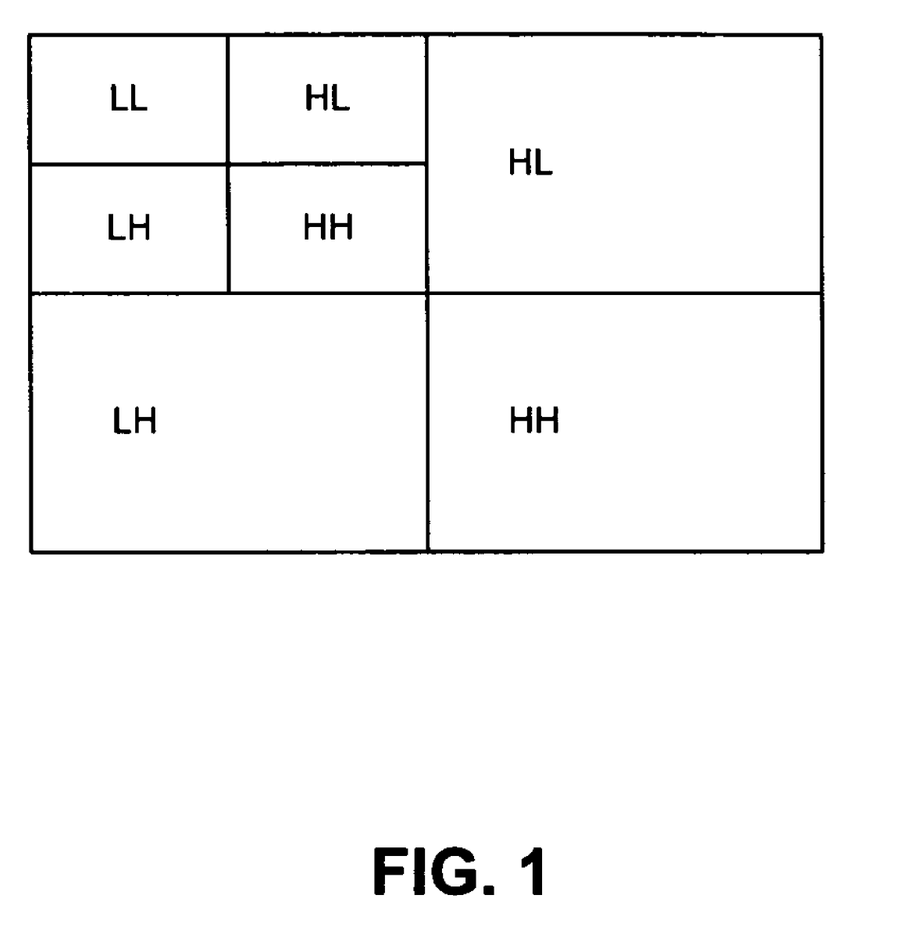
FIG. 1 is a schematic diagram illustrating an embodiment of a Discrete Wavelet Transform (DWT).

In wavelet decomposition, an image is repeatedly filtered and decimated into high and low spatial frequency bands, alternating between horizontal and vertical directions. The LL band, for example, is the result of low-pass filtering in both directions, HL is high-pass followed by low-pass, and so on. FIG. 1 is a schematic diagram illustrating an embodiment of a DWT and shows labelling assuming horizontal filtering is done first. In LL and HH sub-bands, there is not an "inherently" preferred spatial orientation of coefficients. However, in HL and LH bands or regions, data is noticeably organized into vertical and horizontal detail respectively. This suggests that different 2D codebooks may be appropriate for different categories of sub-bands or for different regions.

The bands designated HL and LH have been high pass filtered in one direction and low pass filtered in the other. A feature of these bands is that the information displays an orientation in the direction that low pass filtering has been applied. It might therefore be expected that the bases in these bands are very different, expressing the preferred direction of orientation in their composition. It also might be expected that a suitable basis dictionary for the LH band turns out to be suitable for the HL band if it is transposed so that the vertical component of an HL basis becomes the horizontal component of an LH basis, and vice versa. Experimentally, this again turns out to be the case.

Figure 3:
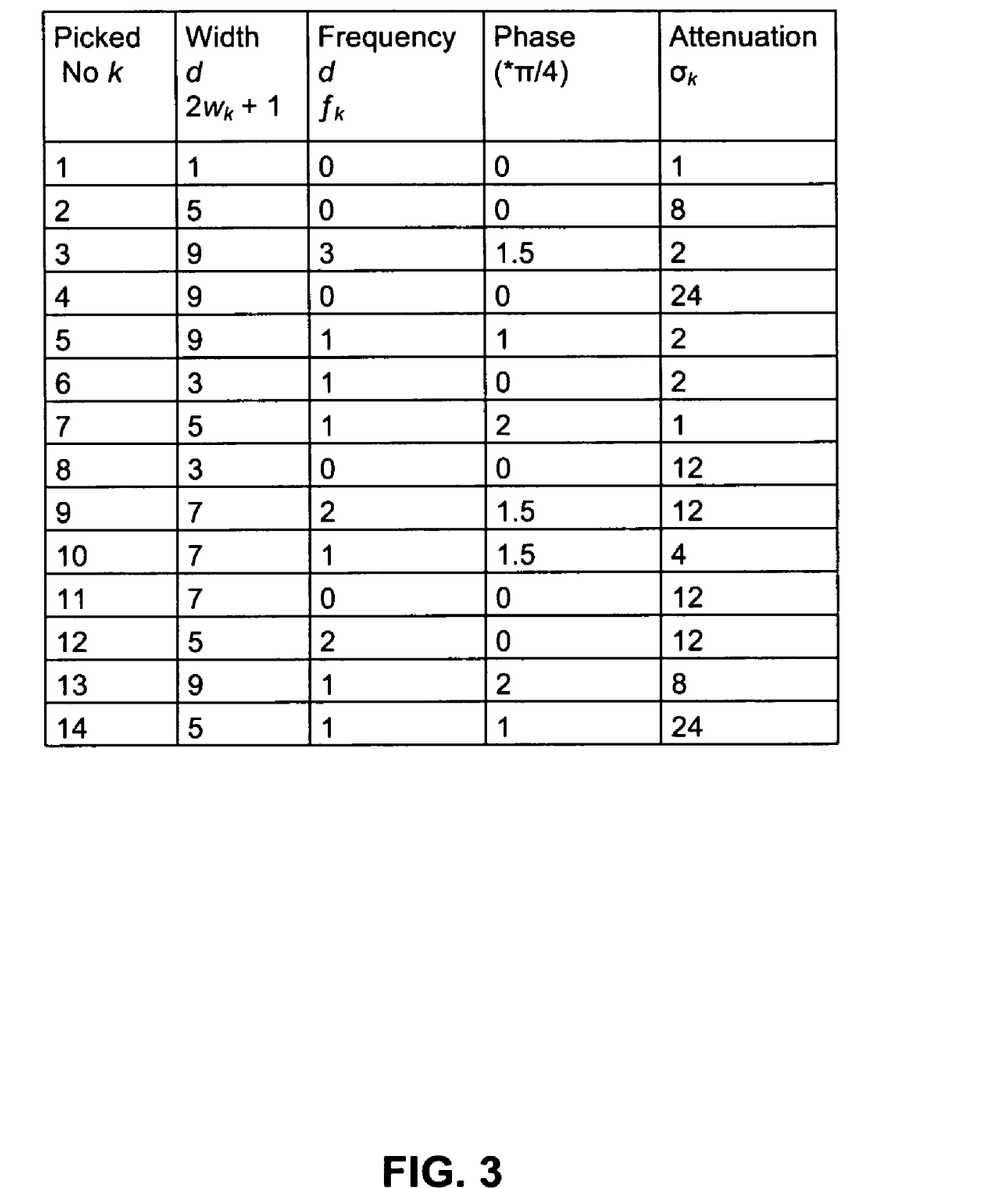
FIGS. 3 and 4 are tables of example bases provided for illustration purposes.

As an example, the table shown in FIG. 3 provides a set of experimentally determined 1D bases from which 2D dictionaries may be 25 formed for image coding. See D. M. Monro and Yuan Yuan, "Bases for low complexity matching pursuits image coding", IEEE Int. Conf. Image Process., September 2005.

Figure 4:
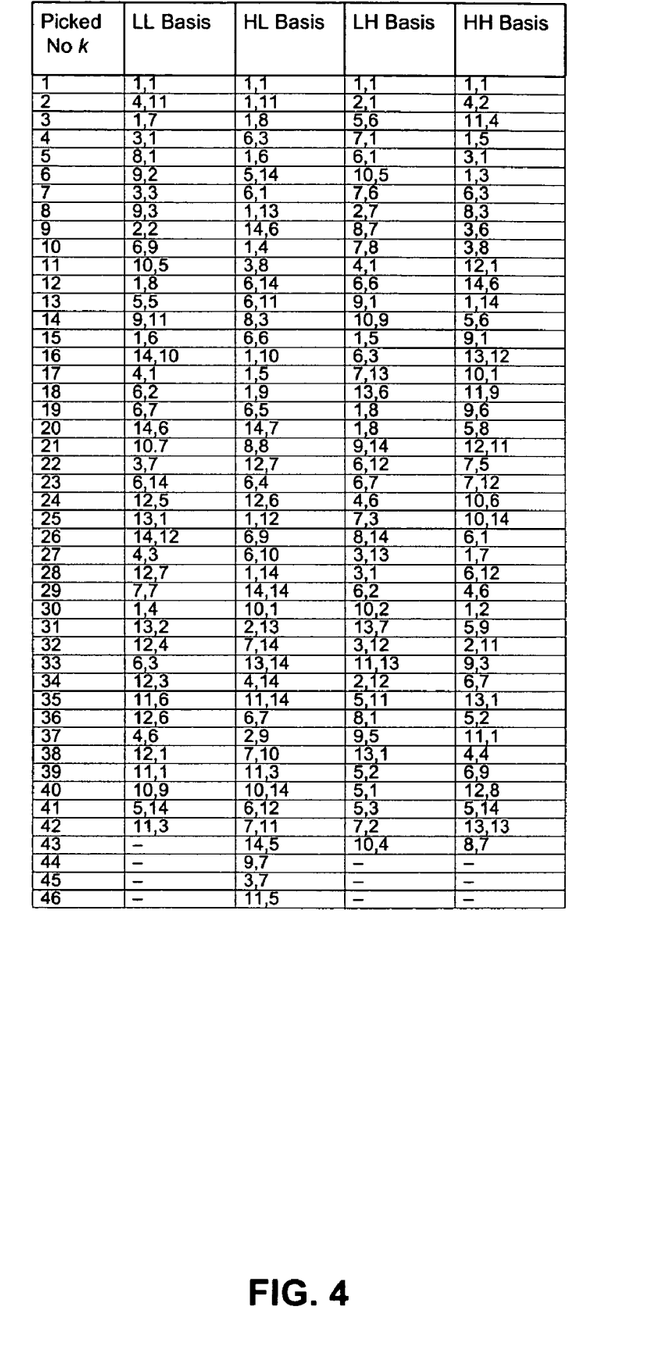

The table in FIG. 3 lists the bases found in the aforementioned article, "Bases for low complexity matching pursuits image coding," with width d=9. The first 8 bases were recommended for coding residual images and the 14 bases for still images. Likewise, after experimentation, it has been found that combinations of bases listed in the table shown in FIG. 4 form a suitable set for image compression by Matching Pursuits if applied to different classes of sub-bands or regions after wavelet decomposition. The table shown in FIG. 4 is derived from "Subband adaptive dictionaries for Wavelet/Matching Pursuits Image Coding," by D. M. Monro, Wei Huo and Xiaopeng Wang, to be presented at the IEEE International Conference in Image Processing (ICIP 2006) on 10 Oct. 2006 in Atlanta, Ga. Likewise, expected characteristics, such as those described above, are demonstrated by this data.

In HL and LH codebooks, 15 of 46 bases appear as transposes, compared to 3.8 (e.g., 4) that would be expected by simple probability. This suggests a potential simplification whereby the HL and LH codebooks are the transpose of one another for some embodiments. Also, 7 of the 42 bases in HH are symmetrical compared with 3 that would be expected, which suggests another simplification for some embodiments. These simplifications may reduce the storage employed for dictionaries and may assist in coding of dictionary entries.

In one possible embodiment, therefore, a reduced, band adaptive dictionary may be implemented as a set of masks corresponding to the different categories of coefficients, applied in coding the corresponding regions of the transform coefficients. By referring to the appropriate mask, in some embodiment, for example, a coder may determine which separable bases to be used to perform inner product calculations in a matching pursuits process, or applied to the data in other coding applications. This may imply, for some embodiments, that selected bases may be used in the first stage operation of separable computation with different bands of coefficients, fewer combinations may be used in the second dimension, and fewer still may be used in higher dimensions, potentially reducing the number of calculations. Of course, this is merely one example embodiment and claimed subject matter is not limited in scope in this respect.

As may now be appreciated from the prior description, not every basis is necessarily effective for image coding in a separable basis dictionary for Matching Pursuits (MP), so that a subset of bases may, in some instances, provide improved PSNR while also reducing computational complexity. To provide further background, MP was introduced by Mallat and Zhang for digital audio. See, for example, S. G. Mallat and Z. Zhang, "Matching pursuits with time frequency dictionaries", IEEE Trans. Signal Processing, vol. 41, pp. 3397-3415, December 1993. Later, Neff and Zakhor applied MP to achieve improved low bit rate video coding for motion compensated residual images within an H.263 video codec. See R. Neff and A. Zakhor "Very low bit rate video coding based on matching pursuits", IEEE Trans. Circuits Syst. Video Techol., vol. 7, pp. 158-171, February 1997. Likewise, in, for example, Y. Yuan and D. M. Monro, "Improved Matching Pursuits Image Coding", Proc. IEEE Int. Conf. Acoustics, Speech, Signal Process., Philadelphia, March 2005, gains in fidelity accompanied by reductions in complexity were achieved in MP for coding both still images and motion compensated residuals. These advances came from various approaches, such as pre-transformation by wavelet, an embedded coding scheme for MP, and improved dictionaries found by 'basis picking,' see, D. M. Monro, "Basis Picking for Matching Pursuits Image Coding", IEEE Int. Conf. Image Process. Singapore, October 2004.

For this particular embodiment, to illustrate, a hybrid wavelet/MP codec is employed, although claimed subject matter is not limited in scope in this respect. Again, this is merely provided as an illustrative example. For coding, a multi-scale wavelet decomposition, for example, may be applied using the well-known bi-orthogonal 9/7 filter bank before MP approximation, although, of course, claimed subject matter is not limited in scope in this respect. It has been shown, for example, that 2 scales for CIF (352×288) residuals and 5 scales for D1 (704×576) still images are a good choice, although, again, this is merely an illustrative example and is not intended to limit the scope of claimed subject matter.

Atoms for MP may be found directly on a 2D wavelet coefficient array using a dictionary of 2D bases. In MP coding, a dictionary of basis functions is typically repeatedly searched for an inner product of largest magnitude within a data set. In 2D, however, it is usual to take a dictionary as a set of 1D bases applied separably, as described above, for example. The bases for this particular embodiment comprise an over-complete, non-orthogonal set of Gabor functions, defined by $$g_k = \left(\exp\left(\frac{-\pi t^2}{\sigma_k}\right)^{0.25} \cos\left(\frac{\pi f_k t}{w_k}\right) + \phi_k\right)$$

where the dictionary index is k and t∈[−$w_k$, ..., $w_k$].
Maximum width ('footprint') (2$w_k$+1)∈[3,5,7,9, ...]
Basis frequencies $f_k$∈[0, 1 ..., $w_k$]
Phase shifts $\Phi_k$∈[0,0.5,1.0,1.5,2)π/4]
Attenuation factors $\sigma_k$∈[1,2,4,8,12,16,20,24]

For this particular embodiment, a subset of a full 2D dictionary may be formed. This may be done for this particular embodiment by introducing a mask into the coding process containing a zero value corresponding to a basis that is not used. Beginning with a completely zero mask, for example, a basis may be used in turn to code a training set on its own. The basis giving the highest PSNR at a desired bit rate, for example, may be selected as a first unmasked dictionary entry. With a first basis determined, a test set may be coded with combinations of this first basis with one other basis, and the highest in terms of a defined performance measure, for example, may then be added to the dictionary to become the second unmasked entry for further runs, etc. This may be done to produce as result a pruned sparse 2D dictionary of every size from 1 to the maximum is available. This process is similar to the basis picking method for selecting 1D bases, discussed in D. M. Monro, "Basis Picking for Matching Pursuits Image Coding", IEEE Int. Conf. Image Process, Singapore, October 2004, although, of course, claimed subject matter is not limited in scope in this respect.

Successive basis masking, of course, may be a computationally intensive process. However, in some embodiments, it may be used to design a masked dictionary and, therefore, may be used in many applications after computation, although claimed subject matter is not limited in scope in this respect. Likewise, for this particular embodiment, four codebooks are sought rather than one. Thus, four masks are used here to select different bases, in this particular embodiment. In this particular embodiment, then a method of coding includes taking into account which sub-band an Atom may occupy, although claimed subject matter is not limited in scope in this respect. Of course, one approach may be to, in a round robin fashion, successively select a basis from a different mask each time in a particular order, such as, for example, LL-HL-LH-LL, although claimed subject matter is not limited in scope in this respect. However, in another embodiment or approach, even if employing smaller, multiple masks, such as four sub bands, for example, still, to select the next basis, the basis providing the highest performance measure outcome, regardless of the mask in which that next basis is located, may be selected. So, in this latter embodiment, if employing multiple, smaller dictionaries, the dictionaries may grow at different rates, some becoming larger than others. Of course, again these are merely illustrative embodiments and are not intended to limit the scope of claimed subject matter.

With a 14×14 dictionary used for coding still images, for example, selecting a first basis may be done by experience, for example, the Dirac or delta function is known to be an effective basis. Finding a second basis, in one particular embodiment may involve trying the remaining basis combinations. This is again repeated with the first and second selected bases and all the remaining basis combinations, and so forth. The approach for this embodiment is similar to selecting 1D bases in the previously cited article, "Basis Picking for Matching Pursuits Image Coding," although, again this is merely an illustrative embodiment and is not intended to limit the scope of claimed subject matter. To determine the number of bases to employ, one approach may be to select the peak PSNR across the spectrum of possible subsets of bases, here, from one basis to a maximum. Of course, again, this is one particular approach, but claimed subject matter is not limited to this particular approach. In another embodiment, one may compare peaks across the spectrum that are relatively close and compare relative complexity. That is, for example, chose a number of bases for the subset of bases to employ, even if it produces a lower PSNR than an alternative, if there is a reduction in the number of bases that is sufficiently great. Likewise, measures other than SNR may be employed. There are countless ways to measure performance, such as visual quality, and SNR or PSNR are simply common examples. However, claimed subject matter is not limited to a particular performance measure.

Figure 2:
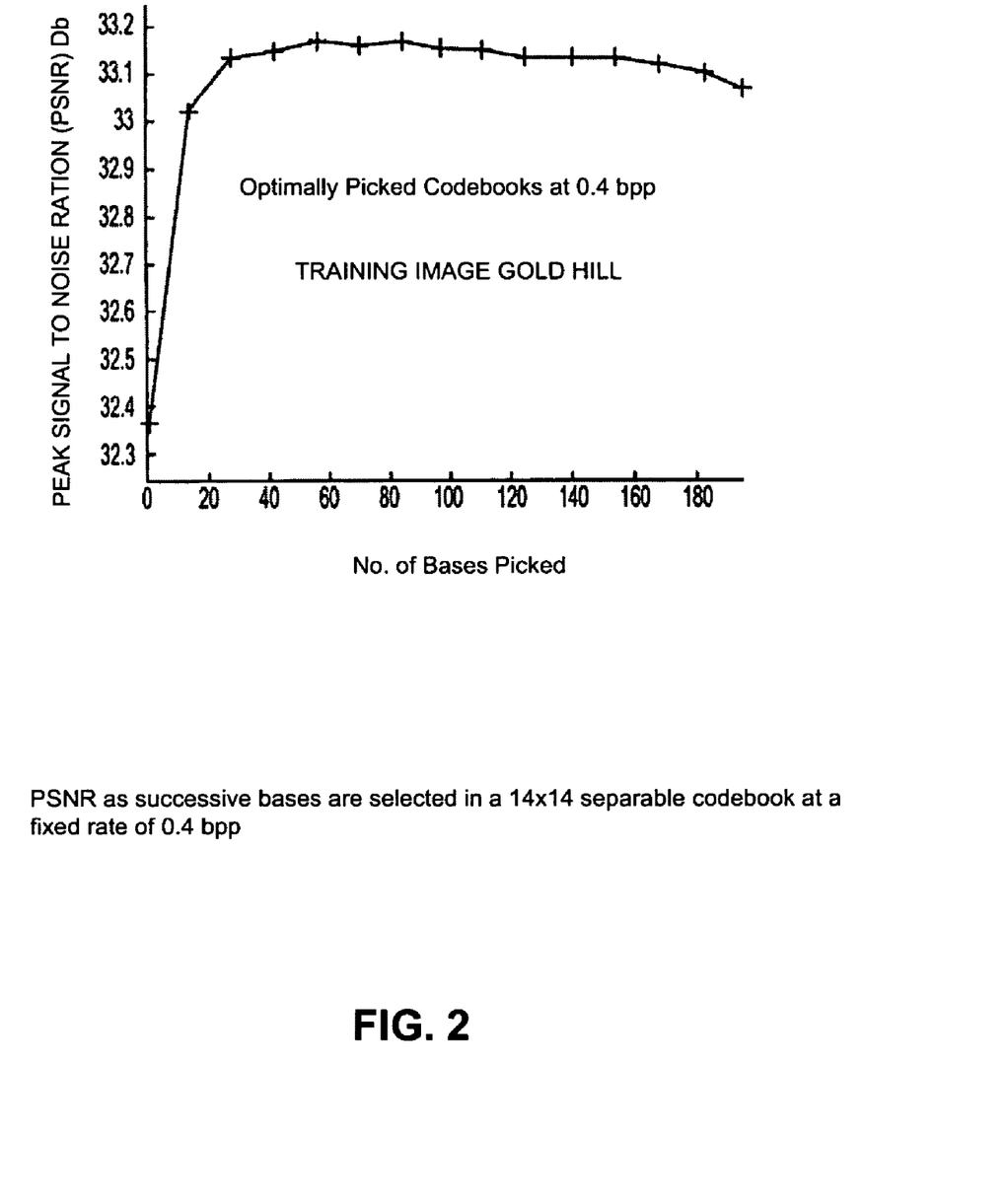
FIG. 2 is a plot illustrating basis picking results for a particular data rate.

A possible or potential result using PSNR is given in FIG. 4, in which mask coordinates of separable bases are made up from bases specified in FIG. 3. For still images, the Gold Hill Illuminance (Y) 704×576 image was used as a training set. For this training image, FIG. 2 shows PSNR as 2D bases are selected at 0.4 bpp. For this example, 32 bases appear to provide a peak value. These examples show that subsets of a 2D separable Matching Pursuits Codebook applied to different wavelet sub-bands given low numbers of bases and reduce complexity, although claimed subject matter is not limited to the specifics of these trail examples. Not surprisingly, masks found at low bit rates work better at low bit rates and those found at high bit rates work better at high bit rates. A masked codebook may in some instances, at least, be found which may provide improved overall PSNR performance.

Of course, as may be appreciated, a dictionary may be described implicitly or explicitly. For example, a functional form or a curve or surface may be specified. Thus, supplying parameters rather than pre-computed basis functions may be employed. A dictionary entry, for example, may be communicated as sampled values of a function. Likewise, a dictionary entry may be communicated as parameters from which a function is capable of being computed. Of course, these are merely examples and claimed subject matter is not limited in scope in this respect.

Likewise, in other alternate embodiments, multiple dimensions, such as three spatial dimensions may be employed. In one such example, a 3D MRI Scan, or a 3D map of the temperature of the ocean or of the atmosphere or of any data or measurement describing a volume may be compressed. Likewise, alternately, a third dimension might be time. Likewise, an embodiment may employ four dimensions, such as, for example, a 3D spatial image and time. More than four dimensions may also be possible as, for example, if there is a relationship between temperature and density plus three spatial dimensions plus time. These are merely illustrative examples and many other embodiments of multiple dimensions are included within the scope of claimed subject matter. Likewise, in some embodiments, data may comprise multiple dimensions even if they might or might not be formed separable from lower dimensional bases. In this case a subset of all the possible bases might be used and a multiple dimension mask might be used to indicate which bases are used.

In an exemplary embodiment, there is a method for successive basis masking of digital data divided into at least four sub-bands by applying a wavelet transform. The method includes repetitively selecting a basis for one of the sub-bands. The bases may be selected at a particular bit rate, such as a particular bit rate to achieve a substantially peak PSNR. The bases may be successively selected for the sub-bands regardless of the particular sub-band for the next successive basis selection. In an example, a basis of the successive bases for a sub-band are selected at a particular bit rate to achieve a substantially peak PSNR if used for coding with the other selected bases. Optionally, the selecting continues until a desired number of bases have been selected, such as from 1 to a maximum. In an embodiment, the sub-bands include more than four sub-bands.

In a further embodiment, there is an article including a storage medium having stored thereon instructions that, if executed, result in execution of a method of successive basis masking for digital data divided into at least four sub-bands by applying a wavelet transform at least by repetitively selecting a basis for one of the sub-bands. Optionally, the instructions, if executed, further result in the bases being selected at a particular bit rate. Further, the instructions, if executed, may further result in the bases being selected at a particular bit rate to achieve a substantially peak PSNR. In an example, the instructions, if executed, further result in the selecting further comprising selecting successive bases for the sub-bands regardless of the particular sub-band for the next successive basis selection. In addition, the instructions, if executed, may further result in a successive basis of the successive bases for a sub-band being selected at a particular bit rate to achieve a substantially peak PSNR if used for coding with the other selected bases. Further, the instructions, if executed, further result in the selecting continuing until a desired number of bases are selected, such as the selecting being performed for every number of bases from 1 to a maximum. In a further example, the instructions, if executed, may further result in the sub-bands comprising more than four sub-bands.

In another example, there is an apparatus including a computing platform that is adapted to successively basis mask digital data if the digital data has been transformed into at least four sub-bands. The computing platform is further adapted to repetitively select a basis for one of the sub-bands. The computing platform may further be adapted to select the bases at a particular bit rate. Optionally, the computing platform is further adapted to select the bases at a particular bit rate to achieve a substantially peak PSNR. The computing platform may be further adapted to select successive bases for the sub-bands regardless of the particular sub-band of the next successive basis selected. The computing platform may further be adapted to select, if used for coding with the other selected bases, the successive bases at a particular bit rate to achieve a substantially peak PSNR. In an example, the computing platform is further adapted to perform bases selection for every number of bases from 1 to a maximum.

Figure 5:
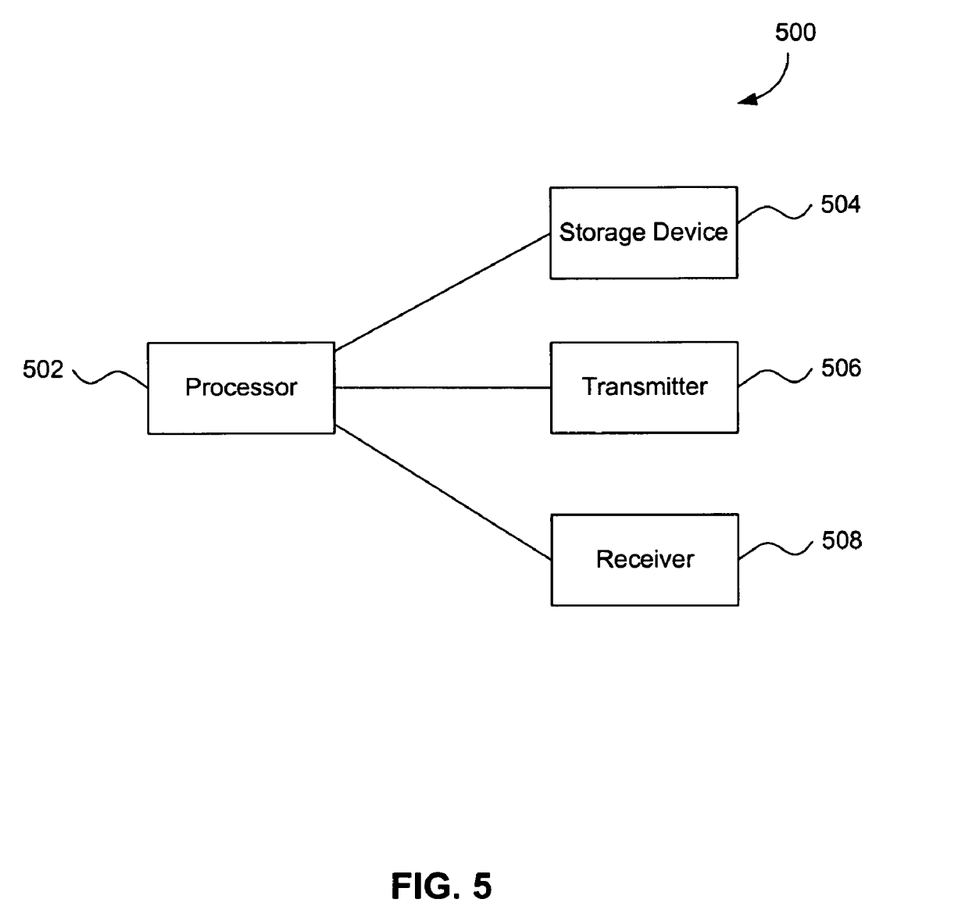
FIG. 5 illustrates an exemplary combination of devices.

It will, of course, be understood that, although particular embodiments have just been described, the claimed subject matter is not limited in scope to a particular embodiment or implementation. For example, one embodiment may be in hardware, such as implemented to operate on a device or combination of devices, such as a combination of devices 500 including a processor 502, a storage device 504, a transmitter 506, and a receiver 508 as illustrated in FIG. 5, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method for matching pursuits basis selection, comprising:
    separating, using a computing device, digital data into a plurality of sub-bands;
    determining, using the computing device, a basis function for the digital data in one of the plurality of sub-bands by applying a mask to a dictionary of basis functions; and
    adding, using the computing device, the basis function to a codebook.

2. The method of claim 1, wherein the separating comprises separating the digital data into the plurality of sub-bands based on a frequency of the digital data.

3. The method of claim 1, wherein the separating comprises separating by applying a wavelet transform to the digital data.

4. The method of claim 3, wherein the separating comprises separating by applying a discrete wavelet transform to the digital data.

5. The method of claim 1, wherein the separating comprises separating by filtering the digital data with a finite impulse response filter.

6. The method of claim 1, wherein the adding comprises using a codebook that is specific to a sub-band in the plurality of sub-bands.

7. The method of claim 1, further comprising:
repeating the determining and adding for a fixed number of repetitions.

8. The method of claim 1, further comprising:
using the codebook to compress the digital data.

9. The method of claim 8, wherein the determining comprises determining at a rate that provides a substantially peak signal to noise ratio for the digital data compressed by the codebook.

10. The method of claim 8, further comprising:
transmitting the compressed digital data.

11. The method of claim 8, further comprising:
storing the compressed digital data.

12. The method of claim 1, further comprising:
using the codebook to decompress the digital data.

13. The method of claim 12, further comprising:
receiving the digital data.

14. The method of claim 13, further comprising:
retrieving the digital data from storage.

15. A tangible computer-readable medium having stored thereon computer-executable instructions, execution of which by a computing device, cause the computing device to perform a method for matching pursuits basis selection comprising:
separating digital data into a plurality of sub-bands;
determining a basis function for the digital data in one of the plurality of sub-bands by applying a mask to a dictionary of basis functions; and
adding the basis function to a codebook.

16. The tangible computer-readable medium of claim 15, wherein the separating comprises separating the digital data into sub-bands based on frequency of the digital data.

17. The tangible computer-readable medium of claim 15, wherein the separating comprises separating by applying a wavelet transform to the digital data.

18. The tangible computer-readable medium of claim 17, wherein the separating comprises separating by applying a discrete wavelet transform to the digital data.

19. The tangible computer-readable medium of claim 15, wherein the separating comprises separating by filtering the digital data with a finite impulse response filter.

20. The tangible computer-readable medium of claim 15, wherein the adding comprises using a codebook that is specific to a sub-band in the plurality of sub-bands.

21. The tangible computer-readable medium of claim 15, wherein the method further comprises:
repeating the determining and adding for a fixed number of repetitions.

22. The tangible computer-readable medium of claim 15, wherein the method further comprises:
using the codebook to compress the digital data.

23. The tangible computer-readable medium of claim 22, wherein the determining comprises determining at a rate that provides a substantially peak signal to noise ratio for the digital data compressed by the codebook.

24. The tangible computer-readable medium of claim 22, wherein the method further comprises:
transmitting the compressed digital data.

25. The tangible computer-readable medium of claim 22, wherein the method further comprises:
storing the compressed digital data.

26. The tangible computer-readable medium of claim 15, wherein the method further comprises:
using the codebook to decompress the digital data.

27. The tangible computer-readable medium of claim 26, wherein the method further comprises:
receiving the digital data.

28. The tangible computer-readable medium of claim 27, wherein the method further comprises:
retrieving the digital data from storage.

29. An apparatus for matching pursuits basis selection, comprising a processor, wherein the processor is configured to:
separate digital data into a plurality of sub-bands;
determine a basis function for the digital data in one of the a plurality of sub-bands by applying a mask to a dictionary of basis functions; and
add the basis function to a codebook.

30. The apparatus of claim 29, wherein the processor is configured to separate the digital data into the plurality of sub-bands based on frequency of the digital data.

31. The apparatus of claim 29, wherein the processor is configured to separate the digital data by applying a wavelet transform to the digital data.

32. The apparatus of claim 31, wherein the processor is configured to separate the digital data by applying a discrete wavelet transform to the digital data.

33. The apparatus of claim 29, wherein the processor is configured to separate the digital data by filtering the digital data with a finite impulse response filter.

34. The apparatus of claim 29, wherein the processor is further configured to use a codebook that is specific to one of the sub-bands in the plurality of sub-bands.

35. The apparatus of claim 29, wherein the processor is further configured to:
repeat the determining and adding for a fixed number of repetitions.

36. The apparatus of claim 29, wherein the processor is further configured to:
use the codebook to compress the digital data.

37. The apparatus of claim 36, wherein the processor is configured to determine the basis function at a rate that provides a substantially peak signal to noise ratio for the digital data compressed by the codebook.

38. The apparatus of claim 36, wherein the processor is further configured to:
transmit the compressed digital data.

39. The apparatus of claim 36, wherein the processor is further configured to:
store the compressed digital data.

40. The apparatus of claim 29, wherein the processor is further configured to:
use the codebook to decompress the digital data.

41. The apparatus of claim 40, wherein the processor is further configured to:
receive the digital data.

42. The apparatus of claim 40, wherein the processor is further configured to:
retrieve the digital data from storage.

43. A system, comprising:
means for separating digital data into a plurality of sub-bands;

means for determining a basis function for the digital data in one of the a plurality of sub-bands by applying a mask to a dictionary of basis functions; and means for adding the basis function to a codebook.

* * * * *

UNITED STATES PATENT AND TRADEMARK OFFICE
CERTIFICATE OF CORRECTION

| | | |
|---|---|---|
| PATENT NO. | : 7,974,488 B2 | Page 1 of 1 |
| APPLICATION NO. | : 11/539164 | |
| DATED | : July 5, 2011 | |
| INVENTOR(S) | : Monro | |

It is certified that error appears in the above-identified patent and that said Letters Patent is hereby corrected as shown below:

On the Title Page
Page 2, item (56), under "Other Publications", Line 30, delete "Codign" and insert -- Coding --.

Page 2, item (56), under "Other Publications", Line 33, delete "Reportfor" and insert -- Report for --.

Page 3, item (56), under "Other Publications", Line 7, delete ""Lossles" and insert -- "Lossless --.

Page 3, item (56), under "Other Publications", Line 36, delete "Heirarchical" and insert -- Hierarchical --.

Page 3, item (56), under "Other Publications", Line 49, delete "pp. II-201-II-204," and insert -- pp. II-201-204, --.

Page 3, item (56), under "Other Publications", Line 54, delete "pp. 111-725-728," and insert -- pp. III-725-728, --.

Column 12, lines 20-21, in Claim 29, delete "the a plurality" and insert -- the plurality --.

Column 13, line 2, in Claim 43, delete "the a plurality" and insert -- the plurality --.

Signed and Sealed this
Eighth Day of November, 2011

David J. Kappos
*Director of the United States Patent and Trademark Office*